March 8, 1960     W. I. WORKMAN     2,927,830
PISTON SEAL
Filed Sept. 12, 1958
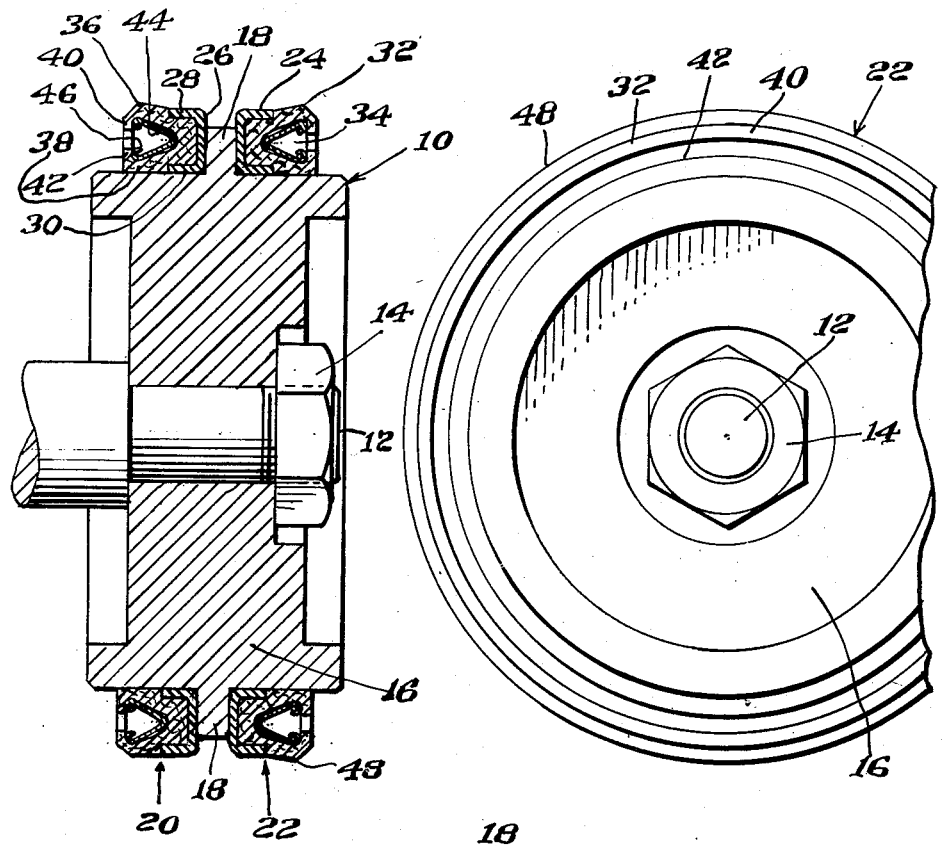
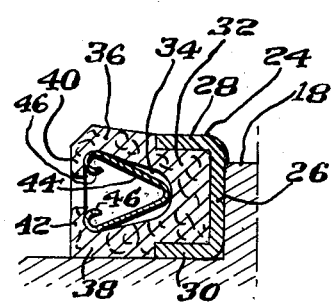

United States Patent Office 2,927,830
Patented Mar. 8, 1960

2,927,830

PISTON SEAL

Woodrow I. Workman, Hill, N.H., assignor to International Packings Corporation, Bristol, N.H., a corporation of Massachusetts Application September 12, 1958, Serial No. 760,767

2 Claims. (Cl. 309—23)

This invention relates to packing or sealing means, and more particularly to an improved sealing structure particularly suitable for use with hydraulic pistons and the like.

The typical seal for such apparatus must perform several functions. Primarily, as the name connotes, it provides a seal between two relatively reciprocal surfaces. In order to do this adequately the seal must be adapted to conform closely with one of the surfaces. Also the seal should be highly resilient such that it will maintain its sealing qualities. These considerations suggest the use of a comparatively soft elastomeric material which is highly resilient and easily conformable. However, the seal must be adapted to be securely positioned relative to a cooperating member and therefore a firm substantial material is required, preferably a hard comparatively non-resilient material. Also, the life of the seal is, in many applications, of prime importance, as for example where corrosive material is handled or as is frequently the case, where seals are difficult to replace. This consideration also suggests a hard material. Often it is desirable that the seal is too capable of performing a guiding function. In such application, wear of material might produce inaccurate or faulty operation.

Accordingly, it is a particular object of the invention to provide an improved sealing means characterized by the provision of an elastomeric member which is formed to have opposed walls resiliently urged outwardly by a circular spring member and which is bonded to a rigid seating and guiding member. In this manner certain desirable qualities of the selected materials can be maximized.

A more general object of the invention is to provide an improved and competitive sealing means which is susceptible to manufacture by mass productive methods.

Other objects and advantages of the invention will become apparent from the following description of a preferred embodiment thereof, in conjunction with the accompanying drawings, in which:

Fig. 1 is a partial sectional view of a piston incorporating a preferred form of the improved sealing assembly according to the invention;

Fig. 2 is a sectional view of a preferred form of the novel piston seal showing its relationship to a cooperating cylinder wall;

Fig. 3 is an end view of the apparatus shown in Fig. 1 and;

Fig. 4 is an enlarged sectional view of a portion of the sealing assembly and piston.

The preferred embodiment of the improved packing or sealing means is shown in Fig. 1 mounted on a piston 10. The piston is secured to a piston rod 12 by means of a nut 14 threaded onto a reduced portion of the rod 12. Thus the piston is securely attached to the piston rod.

The piston 10 has a main hub portion 16 with a medially disposed web 18 which extends radially from the main hub portion about the entire circumference thereof. A seal 20, 22 is disposed on either side of the web 18.

Each seal comprises an annular U-shaped metallic sleeve or base member 24. The metal preferably is moderately hard non-extrudable material having a low coefficient of friction and good wear resistance properties. Each sleeve member is formed to have a base portion 26 and two upstanding parallel side portions 28 and 30 such that a U-shaped channel is formed. Secured within the channel is an insert 32 of suitable elastomeric material such as synthetic rubber, nylon, Teflon or Kel-F, for example. The insert 32 preferably is bonded to the sleeve such that it fills the entire channel. The outer surface portions of the insert form extensions of the upstanding side portions 28 and 30 such that a smooth continuous surface is provided. A cavity 34 or recess is formed within the insert such that two substantially cylindrical wall portions 36 and 38 are defined between the outer surfaces which form extensions of the side portions 28 and 30 respectively and the cavity. The upper end of the outer wall portion 36 is chamfered slightly. Lips 40 and 42 respectively are formed in the upper portions of the wall and extend inwardly over the cavity.

A V-shaped annular spring member 44 is formed from flat resilient spring stock. The spring is formed to have an angle of approximately 90° at its apex in unstressed condition. The upper ends 46 of the spring are rounded over such that they present a smooth surface non-injurious to the elastomeric material. The spring is inserted within the cavity such that it is secured therein by the lip portions. The apex is positioned near the base of the cavity and the upper portions of the spring press against the wall portions of the insert, urging them outwardly. The spring may be compressed such that it is easily inserted into the recess provided. The coaction of the lip portions with the ends thereof make it unnecessary to resort to a bonding process or similar means to secure the resilient member therein. Thus the V-shaped spring exerts pressure over the entire circumferential length of both opposed walls, such that either may provide a suitable sealing surface.

In assembling the seals to the piston the sleeve portion of each seal is securely related to the piston by means of an interference or press fit and is positioned adjacent the web 18 such that it is securely seated thereon. A seal is placed on either side of the web such that the oppositely disposed elastomeric wall portions provide adequate sealing action for reciprocal motion of the piston in both directions. When in this position the inner wall of the elastomeric insert is in contact with the piston hub and in line with the side portions of the metal sleeve such that the spring has no substantial distorting effect thereon. The spring however, does act against the outer wall of the insert such that it is forced outwardly beyond the outer edge of the sleeve as shown in Fig. 1. In this manner an associated sealing surface 48 is provided which cooperates with a cylinder wall 50 as shown in Fig. 2. The outer side of the channel acts as a guiding surface with the cooperating cylindrical surface thereby providing sufficient stability of motion of the piston without the necessity of utilizing a specially designed bearing material.

This novel construction permits the selection of materials primarily according to a single characteristic. Thus the elastomeric material may have a sealing quality of suitable longevity without the necessity of compromise to provide adequate resiliency. The latter is provided by the V-shaped spring member which is mechanically secured within a recess provided in that material. Neither must the elastomer perform a securing function as a metallic sleeve member is provided for that purpose. The entire construction is designed such that the seal may be easily mass produced and sold at competitive prices.

Thus it will be seen the invention provides an improved type of sealing apparatus. Although, a preferred embodiment of the invention has been shown and described it will be understood that the invention is not intended to be limited thereto or to details thereof and departures may be made therefrom within the spirit and scope of the invention as defined in the following claims.

I claim:

1. A piston comprising a cylindrical hub having a medially disposed radial web, and annular sealing members disposed on either side of said radial web, each said sealing member comprising an annular sleeve of hard non-extrudable bearing material having a base portion and two upstanding parallel side portions, each said base portion having a dimension greater than the width of said radial web, an elastomeric insert secured within said annular sleeve and having in cross section opposed wall portions shaped to form extensions of said side portions, such that a cavity is provided between said opposed wall portions and inwardly extending lip portions on upper ends of said wall portions, an annular V-shaped spring member disposed within said cavity, said lips adapted to secure said spring within said cavity, said spring being adapted to force wall portions outwardly into sealing engagement with the surface of a cooperating cylindrical member.

2. A piston sealing member for sealing a piston relative to a cooperating cylindrical surface comprising an annular U-shaped sleeve member of bearing material, said sleeve member having a base portion and two upstanding parallel side portions, one of said side portions adapted to be secured by press fit to said piston and the other of said side portions adapted to provide a guiding surface relative to said cylinder as said piston is moved there past, an annular insert of elastomeric material bonded to said sleeve member, said insert having in cross section, a cavity open at the top and centrally located opposite said base portion such that two opposed wall portions are formed, said wall portions being shaped to form an extension of said parallel sides, and having an inwardly extending lip on the inner edge of each of said walls at the upper ends thereof, and an annular V-shaped spring member positioned within said cavity and secured therein by said lip portions, said spring member adapted to resiliently urge said wall portions outwardly such that an outer surface thereof may be maintained in sealing engagement with said cooperating cylindrical surface.

References Cited in the file of this patent

UNITED STATES PATENTS

| | | |
|---|---|---|
| 2,454,036 | Clayton-Wright | Nov. 16, 1948 |
| 2,687,335 | Bowerman | Aug. 24, 1954 |